United States Patent [19]
Puy et al.

[11] Patent Number: 5,705,717
[45] Date of Patent: Jan. 6, 1998

[54] FLUORINATION PROCESS USING HYDROGEN FLUORIDE-CONTAINING FLUORINATING AGENTS

[75] Inventors: Michael Van Der Puy, Amherst; Jeffrey Warren Mckown, East Aurora; Hang Thanh Pham, Amherst; Andrew Joseph Poss, Kenmore; Rajiv Ratna Singh, Getzville, all of N.Y.

[73] Assignee: AlliedSignal Inc., Morris County, N.J.

[21] Appl. No.: 610,822

[22] Filed: Mar. 7, 1996

[51] Int. Cl.$^6$ .......... C07C 17/013; C07C 17/02; C07C 17/08; C07C 17/087
[52] U.S. Cl. .......... 570/164; 570/167; 570/168
[58] Field of Search .......... 570/164, 167, 570/168

[56] References Cited

U.S. PATENT DOCUMENTS

| | | | |
|---|---|---|---|
| 1,470,772 | 10/1923 | Simon . | |
| 2,903,345 | 9/1959 | Hedley et al. | 41/42 |
| 3,591,432 | 7/1971 | Vazirani | 156/3 |
| 3,635,836 | 1/1972 | Mullen | 252/316 |
| 4,210,460 | 7/1980 | Seidenberger | 134/7 |
| 4,297,257 | 10/1981 | Elias et al. | 260/29.6 |
| 4,373,050 | 2/1983 | Steinbrecher et al. | 524/405 |
| 4,383,868 | 5/1983 | Braley | 134/7 |
| 4,766,258 | 8/1988 | Komatsu et al. | 570/168 |
| 5,073,363 | 12/1991 | Pellico | 424/49 |
| 5,105,033 | 4/1992 | Swearingen et al. | 570/166 |

FOREIGN PATENT DOCUMENTS 1572032  7/1980  United Kingdom .

OTHER PUBLICATIONS

*Chemical Abstracts* 120:57882q (1994) for Russian Patent No. 1,566,651 of Molokhov et al. entitled "Manufacture of Gaseous Hydrogen Fluoride".

Jache, Albert W. and Cady, George H. "Solubility of Fluorides of Metals in Liquid Hydrogen Fluoride" *J. Phys. Chem.* 56 (1952) 1106.

Miller, Jr., W.J. and Fainber, Arnold H., "Preferential Replacement Reactions of Highly Fluorinated Alkyl Halides. I. Preparation of Certain Fluorinated Allyl Iodides", *J. Am. Chem. Soc.* 79 (1957) 4164.

Emsley, John, "Glacial Acetic Acid as a Non-aqeous Solvent for Metal Fluorides", *J. Chem. Soc.* A (1971) 2511.

Simons, J.H. and Lewis, C.J. "Preparation of Benzotrifluoride" *J. Am. Chem. Soc.* 60 (1938) 492.

Bradley, Gordon K., "Several Remedies for the Treatment of Spillages of Liquid Hazardous Chemicals" Proceedings of the 1980 National Conference on Control of Hazardous Material Spills, May 13–15, 1980 Louisville, Kentucky.

Bailar, Jr., J.C. (ed.) *Comprehensive Inorganic Chemistry*, Pergamon Press, p. 1046 (1973).

*Primary Examiner*—Johann Richter
*Assistant Examiner*—Jane C. Osweck
*Attorney, Agent, or Firm*—Lois A. Gianneschi

[57] ABSTRACT

Fluorination processes using hydrogen fluoride-containing fluorinating agents that are safely and easily handled, transported, and stored and that also exhibit good reactivity are provided. More particularly, the invention provides processes for producing fluorinated products using fluorinating agents comprising hydrogen fluoride and a carrier that may be an acid salt or a water-soluble polymer.

27 Claims, 3 Drawing Sheets

FLUORINATION PROCESS USING HYDROGEN FLUORIDE-CONTAINING FLUORINATING AGENTS

FIELD OF THE INVENTION

This invention relates to fluorination reactions, fluorinating agents used therein and their preparation. More particularly, this invention relates to processes for producing fluorinated products using a hydrogen fluoride-containing fluorinating agent that may be safely and easily handled, transported, and stored that also exhibits good reactivity.

BACKGROUND OF THE INVENTION

Fluorination reactions, and fluorinating agents useful in such reactions, are well known in the art. A fluorination reaction is any one of the variety of chemical transformations resulting in the incorporation of one or more fluorine atoms into a molecule. Exemplary fluorination reactions include, without limitation, hydrofluorination, fluorodehydroxylation, bromofluorination, halogen exchange, and the formation of fluoroalcohols from epoxides. These fluorination reactions are effected by fluorinating agents, which are agents capable of acting as a source of fluorine.

Of the known fluorinating agents, hydrogen fluoride is the most economical and widely used. However, pure hydrogen fluoride is a volatile substance. Therefore, the use of pure hydrogen fluoride as a fluorinating agent poses certain disadvantages in its shipping, storage, and handling.

A variety of methods have been used to reduce the volatility of hydrogen fluoride including using complexes of hydrogen fluoride and tertiary or aromatic amines, which complexes exhibit a lower vapor pressure than pure hydrogen fluoride. However, the use of these complexes is disadvantageous due to the toxicity of the amines as well as the poor storage stability, at ambient temperatures, and modest reactivity of some of these complexes.

Complex salts of hydrogen fluoride and metal fluorides, i.e., potassium bifluoride and sodium bifluoride, also have been used. These salts are solids under normal conditions that exhibit low vapor pressures compared to pure hydrogen fluoride. Unfortunately, these salts do not readily release hydrogen fluoride and are unsuitable for use in many fluorination reactions. Higher complexes such as NaF·2HF have been used, which complexes also suffer from poor reactivity.

Thus, a need exists for a hydrogen fluoride fluorinating agent that is less hazardous than pure hydrogen fluoride, but that also exhibits good reactivity.

DESCRIPTION OF THE INVENTION AND PREFERRED EMBODIMENTS

The present invention provides a process for producing fluorinated products using a hydrogen fluoride-containing fluorinating agent as well as methods for preparation of the fluorinating agent. The fluorinating agent may be in solid or liquid form and exhibits both a lower vapor pressure in comparison to pure hydrogen fluoride and good reactivity in that fluorination may proceed under relatively mild conditions. The fluorinating agent is advantageous compared to pure hydrogen fluoride and prior art hydrogen fluoride-containing fluorinating agents in that it exhibits good reactivity in addition to being easily stored, handled, and transported.

The fluorination process of the invention comprises initiating a fluorination reaction by contacting a fluorinating agent comprising an effective amount of hydrogen fluoride and a carrier with at least one feed material to form a reaction product comprising a fluorinated product. Carriers useful in the fluorinating agent of the invention are materials that do not participate as reactants in the fluorination reaction utilized and that, when combined with hydrogen fluoride, serve to lower the vapor pressure of the hydrogen fluoride without substantially altering the ability of the hydrogen fluoride to act as a fluorinating agent. Suitable carriers for use in this invention include acid salts and water-soluble polymers.

The acid salts useful as carriers are salts of acids which acids are liquids at room temperature, have a $pK_a$ of about 4 or less, preferably about 0 or less, and are soluble in hydrogen fluoride. Exemplary acids include, without limitation, carboxylic acids such as trifluoroacetic acid, sulfonic acids such as methanesulfonic and trifluoromethanesulfonic acids, and inorganic acids such as phosphoric acid, and sulfuric acid. Preferably, strong acids such as trifluoroacetic, sulfuric, or sulfonic acids are used. The acid salt counterion may be any counterion that forms a salt with the acid selected, which salt is soluble in hydrogen fluoride. By soluble in hydrogen fluoride is meant that the acid salt dissolves, or forms a homogeneous solutions with hydrogen fluoride, in about ten times its weight or less of hydrogen fluoride. The acid salt counterion may be ammonium, an alkyl ammonium such as tetramethyl- or tetraethylammonium, or an alkali metal (Group IA) cation. Illustrative acid salts include, without limitation, ammonium sulfate, potassium formate, sodium propionate, ammonium trifluoroacetate, and ammonium methanesulfonate. Preferably, ammonium sulfate, ammonium methanesulfonate, or ammonium trifluoroacetate is used.

Alternatively, the carrier may be a water-soluble polymer. The term "polymer" is meant to include homopolymers, copolymers, and mixtures thereof. By "water-soluble polymer" is meant any high molecular weight compound that swells, to about twice its dry volume, or dissolves with the addition of water at room temperature.

Water-soluble polymer is meant to include semi-synthetic water-soluble polymers, synthetic water-soluble polymers, and mixtures thereof. Semi-synthetic water-soluble polymers are natural water-soluble polymer derivatives. Synthetic water-soluble polymers are not natural water-soluble polymer derivatives and are formed only through chemical reactions. Also, generally, the polymers used in the invention have molecular weights of from about 5,000 to 10,000,000. Preferably, polymers with molecular weights of from about 5,000 to about 1,000,000 are used.

Exemplary semi-synthetic water-soluble polymers include, without limitation, cellulose ethers, modified starches, starch derivatives, natural gum derivatives, and mixtures thereof. Illustrative synthetic water-soluble polymers include, without limitation, polymers, related polymers, and polymer salts of acrylamide, acrylic acid, ethylene oxide, methacrylic acid, polyethylimine, polyvinyl alcohol, polyvinyl pyrrolidine, and mixtures thereof. By related polymer is meant that the polymer repeat unit, or a branch thereof, is extended by carbon atoms, preferably from one to four carbon atoms. For example, a related polymer of acrylic acid is a polymer in which the vinyl group is extended by one carbon atom to form an allyl group.

Preferably, a synthetic water-soluble polymer is used. More preferably, the polymer is polyacrylic acid or a salt of polyacrylic acid. Most preferably, sodium polyacrylate is used.

The hydrogen fluoride used in the fluorinating agents of the invention is anhydrous hydrogen fluoride with a water content of less than about 0.1%, which is commercially available. Similarly, the acid salt carrier is substantially anhydrous having a water content of less than about 1%. A number of substantially anhydrous acid salts are commercially available. Alternatively, substantially anhydrous acid salts may be produced by using any of the well known drying techniques such as desiccant or vacuum drying.

To prepare the fluorinating agents of the invention, the carrier is mixed with an effective amount of hydrogen fluoride in any suitable corrosion resistant vessel. The amount of hydrogen fluoride used in the fluorinating agent is an amount effective to maintain the desired level of fluorination of the feed materials, but that, when combined with the carrier, has a vapor pressure that is substantially reduced relative to pure hydrogen fluoride. If the carrier is an acid salt, the acid salt is mixed and dissolved in the hydrogen fluoride to form a homogeneous mixture. If the carrier is a polymer, the polymer and hydrogen fluoride are mixed to form an intimate mixture. The polymer may be in any form for mixing with the hydrogen fluoride including, without limitation, granules, beads, pellets, fibers, or mats. Mixing may be accomplished by any means convenient including, without limitation, stirring or dispersing the polymer into a pool of hydrogen fluoride or passing hydrogen fluoride over the polymer. Typically, mixing is performed at from about 0° to about 100° C., preferably from about 10° to about 40° C. Pressure is not critical.

If the carrier selected is an acid salt that is not readily available or is expensive, the acid salt may be prepared by mixing the acid with a bifluoride salt. As yet another alternative, the acid salt may be made in situ by mixing together the acid, bifluoride salt, and hydrogen fluoride.

One ordinarily skilled in the art will recognize that a balance preferably is to be achieved between using a very small amount of hydrogen fluoride, for which the vapor pressure will be very low but the fluorination activity correspondingly low, and a large amount of hydrogen fluoride, for which the vapor pressure reduction will be less but the fluorination activity high. Generally, the amount of hydrogen fluoride used is from about 10 to about 99, preferably from about 40 to about 98, weight percent based on the total weight of the fluorinating agent. For the HF/acid salt fluorinating agent, most preferably from about 55 to about 85 weight percent of hydrogen fluoride is used. In the HF/polymer fluorinating agents, most preferably, from about 60 to about 90 weight percent of hydrogen fluoride is used.

Depending upon the carrier and the weight percent of hydrogen fluoride, the form of the fluorinating agent will range from liquid to viscous liquid to gel-like solid to solid. Generally, for ammonium salts of acids having $pK_a$'s of about 3 or less, the fluorinating agent will be liquid even with a hydrogen fluoride content of about 65 weight percent or less making these carriers especially attractive because they are liquid over a wide range of hydrogen fluoride content. For other acid salts, such as sodium or potassium salts of carboxylic acids, the liquid range will be narrower. For water-soluble polymers, the liquid range may be only from about 80 weight percent or greater hydrogen fluoride.

The choice of solid, gel-like solid, or liquid will depend on a number of factors including the specific fluorination reaction to be used, the scale of the reaction, and the desired processing of the product mixture. Fluorinations using the solid fluorinating agent may be amenable to a flow system in which liquid feed materials to be fluorinated are allowed to flow down a column containing the fluorinated agent. Solid fluorinating agents may be removed from the fluorinated product by simple filtration or decantation. Liquid fluorinating agents may be preferred when the scale of the reaction is large or the fluorination product has little solubility in the fluorinating agent and can be simply removed from an immiscible liquid fluorinating agent.

Without departing from the scope of the invention, it will be recognized that other components may be included in the fluorinating agents of the invention. In general, any component that does not deleteriously effect the fluorinating activity or increase the volatility of the hydrogen fluoride may be used.

The fluorinating agents of this invention may be used in any of the well known fluorination reactions, which reactions are conducted over a wide range of conditions, catalytic and non-catalytic. The reactions may be carried out in batch, intermittent, or continuous mode. The precise reaction conditions used will depend upon the type of fluorination reaction chosen. Generally, the conditions used are those conditions suitable to form a fluorinated product, which conditions are readily determinable by one ordinarily skilled in the art.

To produce a fluorinated product by the process of this invention, a liquid or vapor phase fluorination reaction is initiated by contacting the fluorinating agent with at least one feed material. The feed material used will depend on the desired fluorinated product. Generally, the feed material may be any unsaturated hydrocarbon, halocarbon having at least one halogen atom other than fluorine, hydrohalocarbon, or mixtures thereof, both saturated and olefinic. Preferably, the feed materials are from 1 to 19 carbon atoms. Exemplary feed materials include, without limitation, olefins such as methyl cyclohexene, haloolefins such as vinylidene chloride, and compounds of the formula $RCCl_3$, in which R is an alkyl or aryl moiety. The initiation and reaction is carried out in any suitable corrosion resistant vessel.

The reaction initiated is carried out under conditions suitable to form a reaction product containing fluorinated product. The reaction product may also contain reaction intermediates and unreacted materials. Typically, the reaction will be carried out at temperatures from about 0° C. to about 200° C., preferably from about 25° C. to about 100° C., and at a pressure of from about 0 psig to about 300 psig, preferably from about 50 to about 200 psig, depending on the specific reaction and productivity requirements. Suitable reaction conditions are readily ascertainable by one ordinarily skilled in the art by a consideration of the temperature of the reaction and nature of the feed material.

Optionally, a fluorination catalyst may be used in the process of this invention. Exemplary catalysts include, without limitation, antimony chloride, tin tetrachloride, titanium tetrachloride, tantalum, niobium chloride and the like. The catalyst is used in an amount effective to accelerate the rate of the fluorination reaction. Generally, from about 1 to about 50 weight percent based on the weight of the fluorinating agent is used. Further, the catalyst may be supported on any suitable support material such as, without limitation, carbon, alumina, chrome oxide, and the like.

When the fluorinating agent of the present invention is used in a fluorination reaction, hydrogen fluoride from the agent will be consumed decreasing the vapor pressure of the fluorinating agent and slowing the reaction. Thus, preferably, an excess of hydrogen fluoride is used in the fluorinating agent. Preferably, the ratio of available hydrogen fluoride in the fluorinating agent to that required by reaction stoichiometry is at least about 5. Additionally, it will be recognized that the solubility limit may be reached so that both liquid and solid forms of the agent will be present.

The fluorinated product formed in the process may be recovered in a step (B) from the reaction mixture by any means known in the art. Typically, the fluorinated product will be immiscible or insoluble in the fluorinating agent and the fluorinated product may be phase separated from the fluorinating agent. In a further step (C), the fluorinated product recovered in step (B) may be purified by any means known in the art as required depending on the end-use.

If the product or feed material is a solid, a solvent may be used, which solvent may be any solvent that is stable and unreactive up to the desired reaction temperature. Generally, the solvent is not miscible with the fluorinating agent of the invention. Suitable solvents include, without limitation, methylene chloride, acetonitrile, and cyclohexane. The preferred solvent will be specific to the fluorination reaction utilized and is readily determinable by one ordinarily skilled in the art.

The invention will be clarified further by a consideration of the following examples that are intended to be purely exemplary.

EXAMPLES

Example 1

Figure 1:
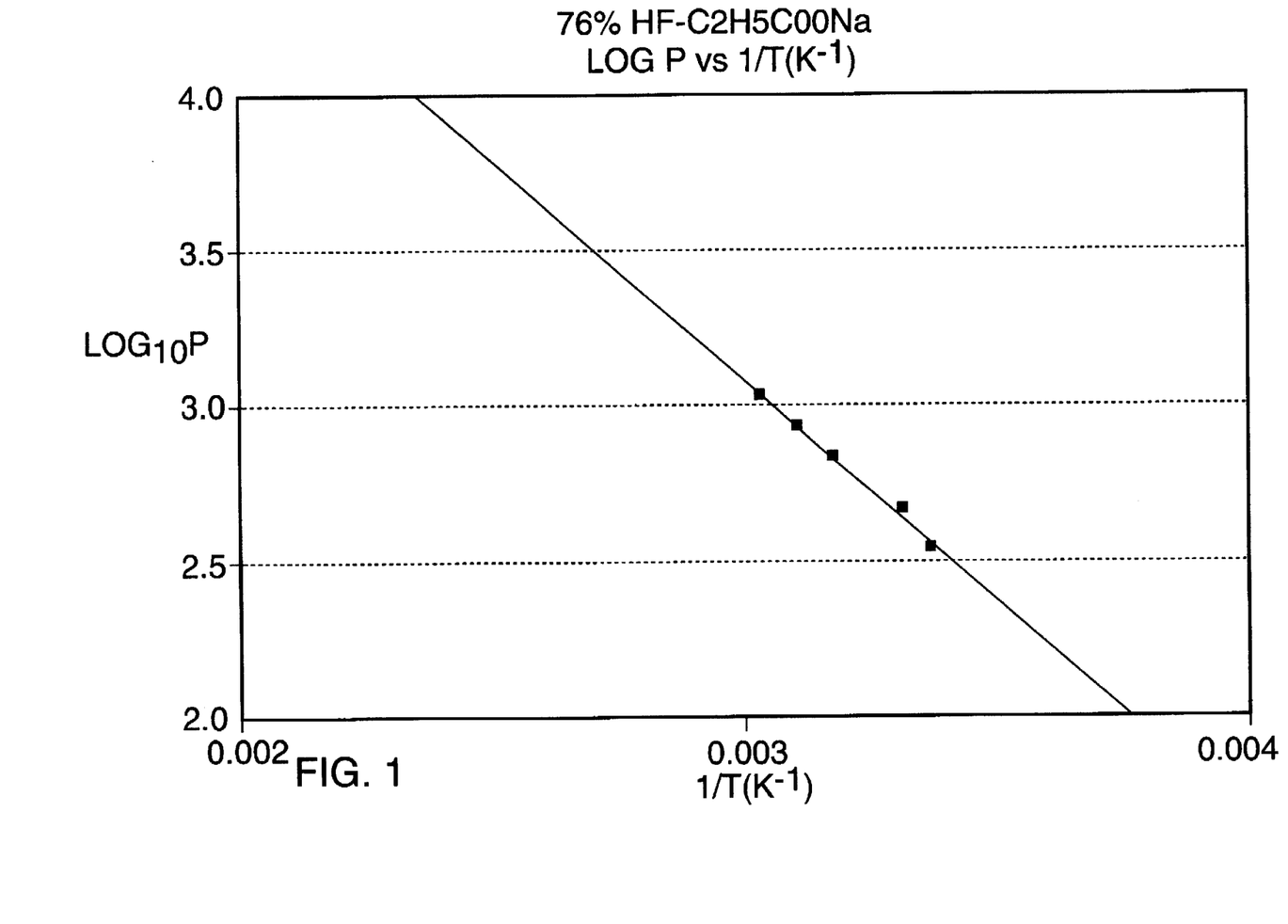
FIG. 1 is a plot of $\log_{10} P$ (mm Hg) versus $1/T$ (° K.) for a sodium propionate/hydrogen fluoride fluorinating agent.
Figure 2:
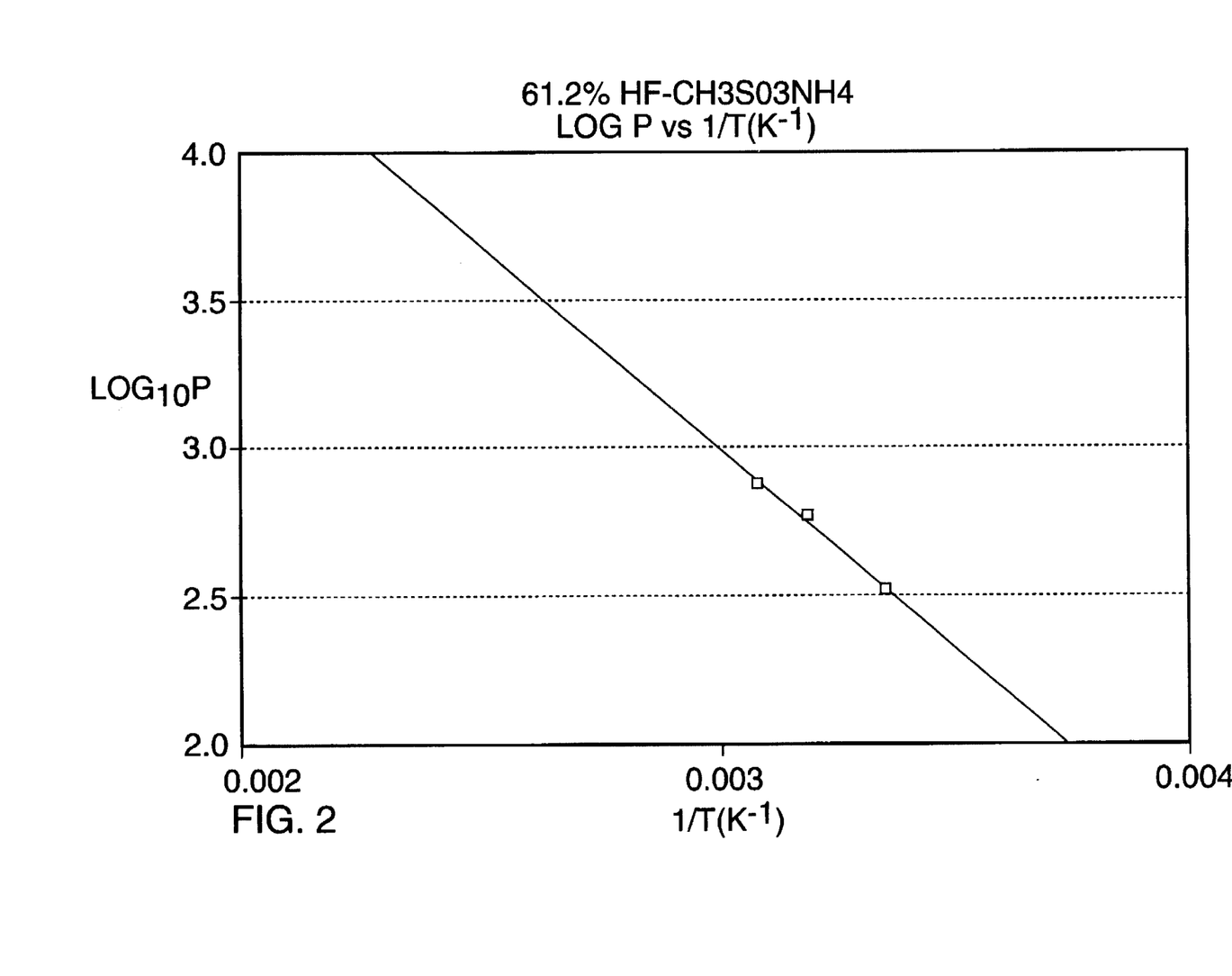
FIG. 2 is a plot of $\log_{10} P$ (mm Hg) versus $1/T$ (° K.) for a ammonium methanesulfonate/hydrogen fluoride fluorinating agent.
Figure 3:
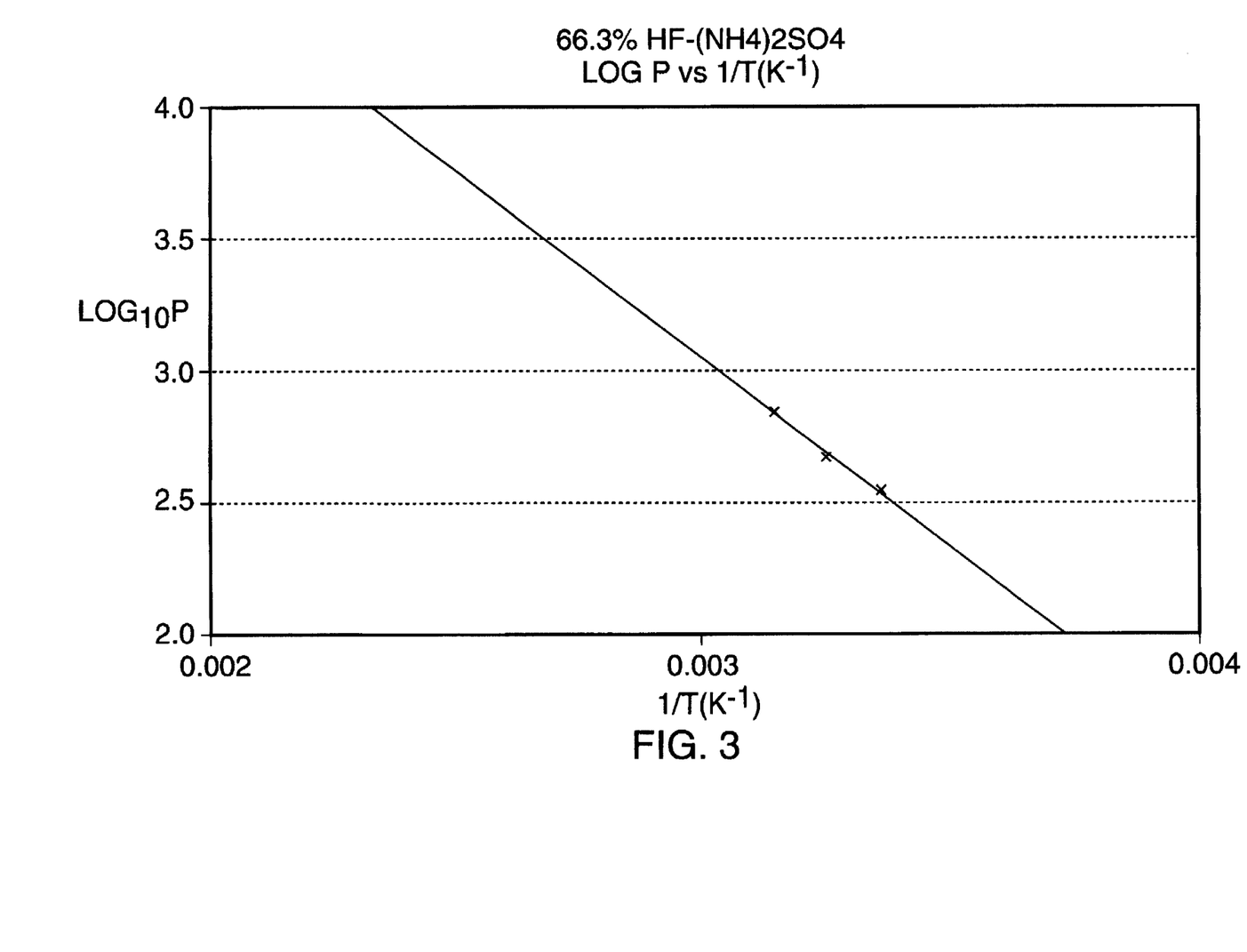
FIG. 3 is a plot of $\log_{10} P$ (mm Hg) versus $1/T$ (° K.) for a ammonium sulfate/hydrogen fluoride fluorinating agent.

Vapor pressures were determined at various temperatures for the following solutions of acid salts: 24.2 weight percent sodium propionate in HF; 38.8 weight percent ammonium methanesulfonate in HF; and 33.7 weight percent ammonium sulfate in HF. Plots of $\log_{10} P$ (ram Hg) versus $1/T$ (° K.) gave straight lines as shown in FIGS. 1-3. From the equation for the line, the temperature corresponding to one atmosphere was calculated with the following results: for 24.2 weight percent sodium propionate in HF the temperature was 45.1° C.; for 38.8 weight percent ammonium methanesulfonate in HF the temperature was 50.5° C.; and for 33.7 weight percent ammonium sulfate in HF the temperature was 59.6° C. The results show substantial vapor pressure reduction compared to pure HF, bp 19.5° C.

Example 2

Qualitative solubility tests were performed to determine which combinations of acid and fluoride salt resulted in a homogeneous solution over a wide range of weight percentages of HF. The data in Table 1 indicate whether or not the fluoride salts dissolved completely in various acids at approximately 25° C. The data indicate that ammonium salts are particularly soluble in strong acids, $pK_a$ of about 0 or less. These mixtures, such as ammonium bifluoride in trifluoroacetic acid may also be thought of as the salt of the acid, i.e., ammonium trifluoroacetate, dissolved in two moles of HF. The calculated weight percentage of HF, assuming all of the fluorine is present as HF, was 23.4%. Formic acid, $pK_a$ 3.75, was also a good solvent, better than the weaker acetic acid, $pK_a$ 4.75, but not as good as the stronger acids such as methanesulfonic, $pK_a$ approximately −3, trifluoroacetic, $pK_a$ 0.2, or sulfuric acid, $pK_a$ approximately −3.

TABLE 1

| | Salt | | | | | | |
|---|---|---|---|---|---|---|---|
| | LiF | | KHF$_2$ | | NH$_4$HF$_2$ | | |
| Acid | 2:1* | 1:1 | 2:1 | 1:1 | 2:1 | 1:1 | 1:2 |
| CH$_3$SO$_3$H | — | — | NO | — | — | YES | — |
| CF$_3$COOH | — | NO | NO | — | — | YES | — |
| CH$_3$COOH | — | — | NO | — | NO | — | — |
| H$_2$SO$_4$ | NO | — | — | NO | — | YES | YES |
| HCOOH | — | — | YES | NO | YES | NO | — |

*Ratios indicate the acid to salt mole ratio.

Example 3

The vapor pressures of a number of HF/sodium polyacrylate mixtures, the polymer having a m.wt of 100,000, were measured. For each example, weighed amounts of the polymer and I-IF were mixed together in a Monel cylinder and the cylinder was repeatedly degassed by freeze and thaw cycles for approximately 4 cycles. The cylinder was placed in a temperature regulated bath and a pressure gauge with a range of 0 to 1000 mm Hg was connected to the cylinder. The vapor pressures were read from the gauge at various bath temperatures and the results are shown on Table 2. The vapor pressures of the mixtures were found to be lower than that of pure HF.

TABLE 2

| HF wt percent | VP at 25° C. | VP at 50° C. | VP at 75° C. | VP at 100° C. |
|---|---|---|---|---|
| 40 | 31 | 143 | 408 | 933 |
| 60 | 436 | 626 | 1003 | over range |
| 70 | 502 | over range | over range | over range |
| 80 | 631 | over range | over range | over range |
| 100* | 914 | 2049 | 4146 | 7743 |

*Literature value.

Example 4

1.6 g of a gel-like composition of 60 weight percent HF and 40 weight percent sodium polyacrylate, m. wt. 100,000, and 2.1 g of 2,6-dichlorobenzoyl chloride were refluxed in 10 mL acetonitrile for 21 hours at which time all of the starting material had reacted. The liquid was separated and the solid washed with a small amount of acetonitrile. The combined acetonitrile fractions were concentrated by rotary evaporation and the residue taken up in 25 mL methylene chloride that was then washed with 10 mL each of 5% aqueous NaOH and water and dried with MgSO$_4$. After removing the volatiles, 0.5 g of product was obtained which was identified by mass spectroscopy (m/z 164 (base), 192 (p, 747%), 194 (P+2, 46.7%), 196 (P+4, 7.3%)) and infra red spectroscopy (C=O at 1839 cm$^{-1}$) as 2,6-dichlorobenzoyl fluoride.

Example 5

2.3 g of a fluorinating reagent composed of 80 weight percent HF and 20 weight percent sodium polyacrylate, m. wt 100,000, and 2.1 g of 2,6-dichlorobenzoyl chloride were refluxed in 8 mL acetonitrile, bp 82° C., for 3.25 hours under a nitrogen atmosphere. Analysis by gas chromatography indicated 100% conversion of starting material and a single reaction product. Work-up provided 1.2 g of 2,6-dichlorobenzoyl fluoride.

Example 6

A 2.1 g solution of 2,6-dichlorobenzoyl chloride in 8 mL cyclohexane was added to 2.3 g of 80 weight percent HF/20 weight percent sodium polyacrylate, m. wt. 100,000. The mixture was stirred and heated to 55° C. for 4 hours. The liquid was decanted and the solid residue washed with 10 mL cyclohexane that was added to the original liquid portion. The combined liquid layers were treated with 1.0 g KF to remove residual HF and filtered. Removal of the solvent under reduced pressure resulted in 1.4 g clear liquid, which by GC analysis was 95% 2,6 di-chlorobenzoyl fluoride and 5% starting material.

Example 7

The room temperature conversion of an aliphatic acid chloride to an acid fluoride at essentially room temperature was demonstrated by the following procedure. A solution of 4.61 g propionyl chloride in 8 mL cyclohexane was added over a 10 minute period at 25° C. to 4.8 g of 80 weight percent HF/20 weight percent sodium polyacrylate, m. wt. 100,000. Evolution of HCl occurred immediately. The mixture was stirred for 1.5 hours. At that time, two liquid layers were present. GC analysis indicated complete conversion of starting material. The product, propionyl fluoride, bp 41° C., was obtained by distillation following a work-up as in Example 6.

Example 8

3.0 g p-toluenesulfonyl chloride were dissolved in 10 mL acetonitrile and the solution added to 4.0 g of 80 weight percent HF/20 weight percent sodium polyacrylate, m. wt. 100,000, fluorinating agent. The mixture was stirred and heated under nitrogen to 85° C. for 17 hours. The cooled mixture was filtered and the solid residue washed with a small amount of acetonitrile. The combined acetonitrile solutions were concentrated by rotary evaporation to yield 5.2 g of a semisolid that was treated with 20 mL dichloromethane and filtered again. The $CH_2Cl$ was removed to yield 2.4 g of a liquid. GC and MS analysis indicated that the product was consistent with 90% p-toluenesulfonylfluoride (MS: m/z 174 (P), 91 (base)) and 6% starting material.

Example 9

7.0 G benzotrichloride were added to 2.4 g of fluorinating agent composed of 80 weight percent HF/20 weight percent sodium polyacrylate, m. wt. 100,000, and the mixture was heated for 1 hour at 65° C. and 1 hour at 110° C. By GC analysis, the conversion of starting material was 47.2%. (Chlorodifluoromethyl)benzene was formed in 9.4% selectivity and (dichlorofluoromethyl)benzene was formed in a selectivity of 83%. The conversion increased only slightly on heating an additional 2.5 hours at 110° C. Approximately 19% of the available HF was utilized.

Example 10

7.0 g of benzotrichloride and 5.0 g of the fluorinating agent of Example 9 were heated to 65° C. over ½ hour and maintained at that temperature for an additional 1 hour. GC analysis indicated a conversion of starting material of 90.6% and a selectivity for (chlorodifluoromethyl)benzene of 14.9% and a selectivity for (dichlorofluoromethyl)benzene of 74.0%. HF utilization was approximately 18%.

It has been shown that when antimony trifluoride was reacted with benzotrichloride in a manner designed to optimize the yield of (dichlorofluoromethyl)benzene, the following product distribution was obtained: 1% $PhCF_3$; 19% $PhCF_2Cl$; 46% $PhCCl_2F$; and 18% $PhCCl_3$. Miller et al., 79 J. Am. Chem. Soc'y. 4164 (1957). Thus, the selectivity for (dichlorofluoromethyl)benzene is superior when the fluorinating agents of the present invention are used compared to antimony trifluoride. Further, Examples 9 and 10 demonstrate that the HF reagent is distinct from HF alone because HF reacts with benzotrichloride at 0° C. to give benzotrifluoride. See Simons et al., 60 J. Am. Chem. Soc'y. 492 (1938). In Example 9, sufficient HF was present to convert all of the benzotrichloride to benzotrifluoride.

Example 11

1.7 g of a 60 weight percent HF/40 weight percent sodium polyacrylate, m. wt. 100,000, fluorinating agent and 7.0 g benzotrichloride were heated to 110° C. for 5.75 hours. By GC analysis, the conversion was 34%. Two major products were formed: (dichlorofluoromethyl)benzene in about 20% selectivity; and benzoyl chloride in 61% selectivity.

Because benzoyl chloride was not formed in substantial quantity in Examples 9 or 10, the result of Example 11 suggests that with fluorinating agents of lower HF content, carboxylate groups in the polymer may interfere with the desired reaction.

Example 12

To a 260 mg (1 mmol) of triphenylmethanol in 1 mL THF was added 0.2 g 80 weight percent HF/20 weight percent sodium polyacrylate, m. wt. 100,000, and the mixture was stirred for 3 hours at 0° C. The liquid was decanted and the gel-like fluorinating agent was washed with 2×1 mL ether. The organic layers were combined with 1 mL water and 1 mL saturated $NaHCO_3$, dried with $MgSO_4$ and evaporated. The crude product was chromatographed on silica gel, eluting with hexane, to give 162 mg of a mixture of starting material and fluorotriphenylmethane ($^{19}F$ NMR:–126 (s) ppm).

Example 12 demonstrates the utility of the fluorinating agents of the present invention in a fluorodehydroxylation reaction.

Example 13

To 0.1 mL (0.845 mmol) of 1-methylcyclohexene in methylene chloride was added 0.2 g 80 weight percent HF/20 weight percent sodium polyacrylate, m. wt. 100,000, fluorinating agent and the mixture stirred for 6 hours at 0° C. The liquid was decanted and the gel-like reagent washed with 2×1 mL methylene chloride. The combined organic layers were washed with 1 mL water and 1 mL saturated $NaHCO_3$, dried with $MgSO_4$ and evaporated to give 33 mg of 1-fluoro-1-methylcyclohexane. $^{19}F$ NMR:–147 (bs) ppm. GC-MS (m/z): 116 (P), 101 (P-$CH_3$), 96 (P-HF), 81.

Example 13 demonstrates the use of the fluorinating agents of the present invention in the addition of HF to an olefin.

Example 14

To 0.1 mL (0.77 mmol) of α-methylstyrene and 164 mg (0.92 mmol) N-bromosuccinimide in 1 mL methylene chloride was added 0.2 g 80 weight percent/20 weight percent sodium polyacrylate, m. wt. 100,000. The mixture was stirred at 0° C. for 0.5 hours and at 25° C. for 2 hours. The liquid was decanted and the reagent washed with 2×1 mL methylene chloride. The combined organic layers were washed, dried and evaporated as in Example 12 to yield 80 mg product. The presence of 1-bromo-2-fluoro-2phenylpropane was established from $^{19}$F NMR (triplet of quartets at −148 ppm).

Example 14 demonstrates the use of the fluorinating agents of the invention in a halofluorination of an olefin.

Example 15

20 g 1,1,1-trichloroethane and 20 g 80 weight percent HF/20 weight percent sodium polyacrylate, m. wt. 100,000, were placed in an autoclave and heated to 80° C. for 6 hours. The autoclave was cooled to −78° C. Volatiles were vented into a cold trap while the autoclave contents were warmed to room temperature. 8.0 g 1,1-dichloro-1-fluoroethane were obtained from the liquid remaining in the autoclave and the material in the cold trap.

Example 16

To a solution of 1-methylcyclohexene (0.1 mL, 0.845 mmol) in methylene chloride (1mL) is added 0.2 g of 90 weight percent HF/10 weight percent acrylamide polymer, m. wt. 50,000, and the solution is stirred until complete by GC. The liquid is decanted and the gel washed with 2×1 mL methylene chloride. The organic layers are combined and washed with 1 mL water, 1 mL saturated NaHCO$_3$, dried through MgSO$_4$ and evaporated. 1-Fluoro-1-methylcyclohexane is afforded.

Example 17

To a solution of 1-methylcyclohexene (0.1 mL, 0.845 mmol) in methylene chloride (1 mL) is added 0.2 g 60 weight percent HF/40 weight percent acrylic acid polymer, M. wt. 500,000, and the solution stirred until complete by GC. The liquid is decanted and the gel washed with 2×1 mL methylene chloride. The organic layers are combined and washed with 1 mL water, 1 mL saturated NaHCO$_3$, dried through MgSO$_4$ and evaporated. 1-Fluoro-1-methylcyclohexane is afforded.

Example 18

To a solution of 1-methylcyclohexene (0.1 mL, 0.845 mmol) in methylene chloride (1 mL) is added 0.2 g 70 weight percent HF/30 weight percent methacrylic acid polymer, 200,000 m. wt., and the solution is stirred until complete by GC. The liquid is decanted and the gel washed with 2×1 mL methylene chloride. The organic layers are combined and washed with 1 mL water, 1 mL saturated NaHCO$_3$, dried through MgSO$_4$ and evaporated. 1-Fluoro-1-methylcyclohexane if afforded.

Example 19

To a solution of triphenylmethanol (260 mg, 1 mmol) in tetrahydrofuran (1 mL) is added 0.2 g 95 weight percent HF/5 weight percent acrylamide polymer, 750,000 m. wt., and the solution is stirred until complete by TLC. The liquid is decanted and the gel is washed with 2×1 mL ether. The organic layers are combined and washed with 1 mL water, 1 mL saturated NaHCO$_3$, dried through MgSO$_4$ and evaporated. The crude product is chromatographed on silica gel. Fluorotriphenylmethane is afforded.

Example 20

To a solution of triphenylmethanol (260 mg, 1 mmol) in THF (1 mL) is added 0.2 g 75 weight percent HF/25 weight percent acrylic acid polymer, 1,500,000 m. wt., and the solution stirred until complete by TLC. The liquid is decanted and the gel is washed with 2×1 mL ether. The organic layers are combined and washed with 1 mL water, 1 mL NaHCO$_3$, dried through MgSO$_4$ and evaporated. The crude product is chromatographed on silica gel. Fluorotriphenylmethane is afforded.

Example 21

To a solution of triphenylmethanol (260 mg, 1 mmol) in THF (1 mL) is added 0.2 g 80 weight percent HF/20 weight percent methacrylic acid polymer, 3,000,000 m. wt., and the solution is stirred until complete by TLC. The liquid is decanted and the gel washed with 2×1 mL ether. The organic layers are combined and washed with 1 mL water, 1 mL Na HCO$_3$, dried through MgSO$_4$ and evaporated. The crude product is chromatographed on silica gel with hexane. Fluorotriphenylmethane is afforded.

Example 22

To a solution of α-methylstyrene (0.1 mL, 0.769 mmol and N-bromosuccinimide (164 mg, 0.923 mmol, 1.2 equ.) in methylene chloride (1 mL) is added 0.2 g 60 weight percent HF/40 weight percent acrylamide polymer, 75,000 m. wt., and the solution stirred until complete by TLC. The liquid is decanted and the gel is washed with 2×1 mL methylene chloride. The organic layers are combined an washed with 1 mL water, 1 mL saturated NaHCO$_3$, dried through MgSO$_4$ and evaporated. 1-Bromo-2-fluoro-2-phenylpropane is afforded.

Example 23

To a solution of α-methylstyrene (0.1 mL, 0.769 mmol) and N-bromosuccinimide (164 mg, 0.923 mmol, 1.2 equ.) in methylene chloride (1 mL) is added 0.2 g 60 weight percent HF/40 weight percent acrylic acid polymer, 5,000 m. wt., and the solution stirred until complete by TLC. The liquid is decanted and the gel is washed with 2×1 mL methylene chloride. The organic layers are combined an washed with 1 mL water, 1 mL saturated NaHCO$_3$, dried through MgSO$_4$ and evaporated. 1-Bromo-2-fluoro-2-phenylpropane is afforded.

Example 24

To a solution of α-methylstyrene (0.1 mL, 0.769 mmol) and N-bromosuccinimide (164 mg, 0.923 mmol, 1.2 equ.) in methylene chloride (1 mL) is added 0.2 g 70 weight percent HF/30 weight percent acrylic acid polymer, 125,000 m. wt., and the solution stirred until complete by TLC. The liquid is decanted and the gel is washed with 2×1 mL methylene chloride. The organic layers are combined an washed with 1 mL water, 1 mL saturated NaHCO$_3$, dried through MgSO$_4$ and evaporated. 1-Bromo-2-fluoro-2-phenylpropane is afforded.

Example 25

To a solution of benzhydrol (184 mg, 1 mmol) in methylene chloride (1 mL) is added 0.2 g 85 weight percent HF/15 weight percent acrylamide polymer, 175,000 m. wt., and the solution stirred until complete by TLC. The liquid is decanted and the gel washed with 2×1 mL methylene chloride. The organic layers are combined and washed with 1 mL water, 1 mL NaHCO₃, dried through MgSO₄ and evaporated. Diphenylmethane is afforded.

Example 26

To a solution of benzhydrol (184 mg, 1 mmol) in methylene chloride (1 mL) is added 0.2 g 90 weight percent HF/10 weight percent acrylic acid polymer, 100,000 m. wt., and the solution stirred until complete by TLC. The liquid is decanted and the gel washed with 2×1 mL methylene chloride. The organic layers are combined and washed with 1 mL water, 1 mL NaHCO₃, dried through MgSO₄ and evaporated. Diphenylmethane is afforded.

Example 27

To a solution of benzhydrol (184 mg, 1 mmol) in methylene chloride (1 mL) is added 0.2 g 90 weight percent HF/10 weight percent methacrylic acid polymer, 100,000 m. wt., and the solution stirred until complete by TLC. The liquid is decanted and the gel washed with 2×1 mL methylene chloride. The organic layers are combined and washed with 1 mL water, 1 mL NaHCO₃, dried through MgSO₄ and evaporated. Diphenylmethane is afforded.

Example 28

3.7 g of a 64 weight percent HF/36 weight percent CF₃COONH₄ fluorinating agent were added to 2.21 g 2,6-dichlorobenzoylchloride dissolved in 5 mL cyclohexane. The two-phase system was stirred vigorously at room temperature for 4 hours. GC analysis indicated complete conversion and only one product peak. The mixture was diluted with 5 mL cyclohexane and the upper layer separated from the lower layer. The lower layer was washed twice with 5 mL cyclohexane and the combined cyclohexane layers treated with a small amount of KF. After filtering the KF, volatiles were removed under vacuum to give 1.86 g, 92% yield, of 99% pure 2,6-dichlorobenzoyl fluoride.

Example 29

0.1 g of 36 weight percent ammonium trifluoroacetate in HF was added to a solution of 0.1 mL 1-methylcyclohexane in 1 mL methylene chloride. The mixture was stirred for 24 hours at 0° C. Analysis of the reaction mixture at this time indicated that it contained 46% 1-fluoro-1-methylcyclohexane and the remainder starting material.

Example 30

The procedure of Example 28 was used except that 38.8 weight percent ammonium methanesulfonate in HF was used. Analysis of the mixture after 24 hours at 0° C. indicated a 57% conversion to 1-fluoro-1-methylcyclohexane, the remainder being starting material.

Example 31

40 g of 36 weight percent ammonium trifluoroacetate in HF and 20 mL 1,1,1-trichloroethane were heated in an autoclave at 80° C. for 6 hours. The mixture was cooled to room temperature and vented. The liquid layers remaining in the autoclave were separated. The top organic layer contained 12.1 g 1-chloro-1,1-difluoroethane.

Example 32

3.4 g benzotrichloide were added to 12.8 g of a mixture of HF and ammonium methanesulfonate containing 61.2 wt % HF. The two phase mixture was stirred vigorously for two hours during which time HCl gas was vented slowly. GC analysis of the organic layer at this time indicated a ratio of (trifluoromethyl)benzene:(difluorochloromethyl)benzene: (fluorodichloromethyl)benzene:(trichloromethyl)benzene (benzotrichloride) of 2:30:30:38, respectively. Benzoyl chloride and benzoyl chloride were also present, about 2% of the total GC area percent.

Example 33

14.6 g of the 61.2 wt % HF/38.8 wt % ammonium methanesulfonate composition of Example 31 were added to 1.8 g of SbCl₅. The result was a clear, pale yellow solution. To this was added 4.0 g benzotrichloride and the mixture stirred vigorously for two hours as in Example 32. GC analysis of the upper organic layer indicated a ratio of (trifluoromethyl)benzene (difluorochloromethyl)benzene: (flurordichloromethyl)benzene:benzotrichioride of 8:76:14:2, respectively. The remaining organic layer was a clear, pale yellow solution. Some benzoyl fluoride was also present in the crude product mixture.

Examples 32 and 33 demonstrate that catalysts may be added to the fluorinating agent of the invention. With SbCl₅ catalyst present in Example 33, considerably more fluorination, Cl-F exchange, occurred relative to Example 32 in which no catalyst was present.

Example 34

30 g of a mixture of ammonium sulfate and HF, which is 80 weight percent HF (24 g, 1.2 mol) is stirred at 35° C. for 8 hr with 22 g 2,3-dichloro-1-propene (0.2 mol). The entire reaction mixture is transferred to a plastic separatory funnel and the organic layer is separated. After washing the organic layer with water and drying, it is distilled. 1,2-Dichloro-2-fluoropropane, bp 89°–90° C. is provided.

What is claimed is:

1. A process for producing a fluorinated product comprising the step of initiating a fluorination reaction by contacting a fluorinating agent comprising an effective amount of hydrogen fluoride and a carrier with at least one feed material selected from the group consisting of unsaturated hydrocarbons, saturated and olefinic halocarbons and hydrohalocarbons having at least one halogen atom other than fluorine, and mixtures thereof, to for a reaction product comprising a fluorinated product.

2. The process of claim 1 wherein the amount of hydrogen fluoride is from about 10 to about 99 weight percent based on the total weight of the fluorinating agent.

3. The process of claim 1 wherein the amount of hydrogen fluoride is from about 55 to about 85 weight percent based on the total weight of the fluorinating agent.

4. The process of claim 1 wherein the carrier is a water-soluble polymer.

5. The process of claim 4 wherein the water soluble polymer is a synthetic water-soluble polymer.

6. The process of claim 4 wherein the synthetic water-soluble polymer is acrylamide polymer, acrylic acid polymer, ethylene oxide polymer, methacrylic acid polymer, polyethyleneimine polymer, polyvinyl alcohol polymer, polyvinyl pyrrolidone polymer, or mixtures thereof.

7. The process of claim 6 wherein the synthetic water-soluble polymer is acrylic acid polymer.

8. The process of claim 7 wherein the acrylic acid polymer is a polyacrylic acid salt.

9. The process of claim 8 wherein the polyacrylic acid salt is sodium polyacrylate.

10. The process of claim 6 wherein the hydrogen fluoride is present in an amount of from about 60 to about 90 weight percent based on the total weight of the fluorinating agent.

11. The process of claim 1 wherein the carrier is a salt of a liquid acid, the acid having a $pK_a$ of about 4 or less.

12. The process of claim 11 wherein the carrier is a salt of an acid, the acid having a $pK_a$ of about 0 or less.

13. The process of claim 11 wherein the acid is a carboxylic, sulfuric, or sulfonic acid.

14. The process of claim 13 wherein the salt of the acid is ammonium methanesulfonate.

15. The process of claim 13 wherein the salt of the acid is ammonium sulfate.

16. The process of claim 13 wherein the salt of the acid is ammonium trifluoroacetate.

17. The process of claim 11 wherein the hydrogen fluoride is present in an amount of from about 55 to about 85 weight percent based on the total weight of the fluorinating agent.

18. The process of claim 1 wherein the at least one feed material is a hydrocarbon, a halocarbon, a hydrohalocarbon, or mixtures thereof having from 1 to 19 carbon atoms.

19. The process of claim 1 wherein the process is carried out at a temperature from about 0° to about 200° C. and a pressure of from about 0 to about 300 psig.

20. The process of claim 1 wherein the process is carried out at a temperature of from about 25° to about 100° C. and a pressure from about 50 to about 200 psig.

21. The process of claim 1 wherein the process is carried out in the presence of a fluorination catalyst.

22. The process of claim 1 wherein the process is carried out in the presence of a supported fluorination catalyst.

23. A process for producing a fluorinated product comprising the step of initiating a fluorination reaction by contacting a fluorinating agent, comprising from about 60 to about 90 weight percent hydrogen fluoride and from about 40 to about 10 weight percent sodium polyacrylate, with at least one feed material selected from the group consisting of unsaturated hydrocarbons, saturated and olefinic hydrohalocarbons and halocarbons having at least one halogen atom other than fluorine, and mixtures thereof having from 1 to 19 carbon atoms and carrying out the fluorination reaction initiated at a temperature from about 25° C. to about 100° C. and pressure of from about 50 to about 200 psig to form a reaction product comprising a fluorinated product.

24. A process for producing a fluorinated product comprising the step of initiating a fluorination reaction by contacting a fluorinating agent, comprising from about 55 to about 85 weight percent hydrogen fluoride and from about 45 to about 15 weight percent of an acid salt having a pKa of about 4 or less, with at least one feed material selected from the group consisting of unsaturated hydrocarbons, saturated and olefinic hydrohalocarbons and halocarbons having at least one halogen atom other than fluorine, and mixtures thereof having from 1 to 19 carbon atoms and carrying out the fluorination reaction initiated at a temperature from about 25° C. to about 100° C. and pressure of from about 50 to about 200 psig to form a reaction product comprising a fluorinated product.

25. The process of claim 24 wherein the acid salt is ammonium methanesulfonate.

26. The process of claim 24 wherein the acid salt is ammonium sulfate.

27. The process of claim 24 wherein the acid salt is ammonium trifluoroacetate.

* * * * *

UNITED STATES PATENT AND TRADEMARK OFFICE
CERTIFICATE OF CORRRECTION

PATENT NO. : 5,705,717
DATED : January 6, 1998
INVENTOR(S) : Puy, et al It is certified that error appears in the above-identified patent and that said Letters Patent is hereby corrected as shown below:

On the title page, under item [56], insert the following:

| | | \multicolumn{6}{c}{FOREIGN PATENT OR PUBLISHED FOREIGN PATENT APPLICATION} | | |
|---|---|---|---|---|---|---|---|---|---|---|---|
| | | | | | | | PUBLICATION | COUNTRY OR | | | TRANSLATION |
| | | \multicolumn{6}{c}{DOCUMENT NUMBER} | DATE | PATENT OFFICE | CLASS | SUBCLASS | YES | NO |
| | | WO | 95 | /1 | 6 | 7 | 4 | 0 | 6/22/95 | PCT | | | | |
| | | | | | | | | | | | | | |

Signed and Sealed this

Second Day of March, 1999

Attest:

Attesting Officer

Q. TODD DICKINSON

Acting Commissioner of Patents and Trademarks